Dec. 15, 1964  B. H. POHLKAMP  3,161,078
PEDAL
Filed Dec. 11, 1961

INVENTOR
Bernard H. Pohlkamp

BY
Stevens, Davis, Miller & Mosher
ATTORNEYS

United States Patent Office 3,161,078
Patented Dec. 15, 1964

3,161,078
PEDAL
Bernard H. Pohlkamp, 5 Julianastraat,
Druten, Netherlands
Filed Dec. 11, 1961, Ser. No. 158,442
Claims priority, application Netherlands Feb. 1, 1961
4 Claims. (Cl. 74—560)

This invention relates to a pedal for motor vehicles or motor cycles.

The pedals known so far are usually provided at their upper surface with a covering which consists of rubber, synthetic rubber or similar material and which is formed by a mainly flat plate of which the upper surface is provided with ribs, diamonds or other unevennesses in order to prevent the foot from sliding off the pedal. Notwithstanding these measures, it often happens, in particular in rainy weather, snow and similar weather conditions, that the foot slips off the pedal, in particular of the brake pedal, so that consequently accidents may result.

This disadvantage is avoided, according to the invention in that the surface of the pedal on which the foot comes to rest is provided in longitudinal direction of the pedal and over a width larger than the part of the foot resting on the pedal with strips lying next to each other and each being spring-mounted.

In the case of the pedal according to the invention when the foot pushes on the pedal part of the upper surface is so pressed in that on both sides of the foot a buffer or abutment rim is formed thus preventing the foot from slipping off the pedal.

A preferred embodiment of the pedal according to the invention is characterized in that each of the strips is provided with two cross-bores for receiving two rods which are fixed at upstanding sides of the pedal and that each strip is provided at the under side with a recess at both sides of the cross-bores, each recess serving for taking up a spring which at the lower end rests on a surface, said surface being integral with the upstanding sides to which the rods are fixed.

The invention will be described below with reference to the accompanying drawings showing by way of example an embodiment of a pedal according to the invention.

Figure 1:
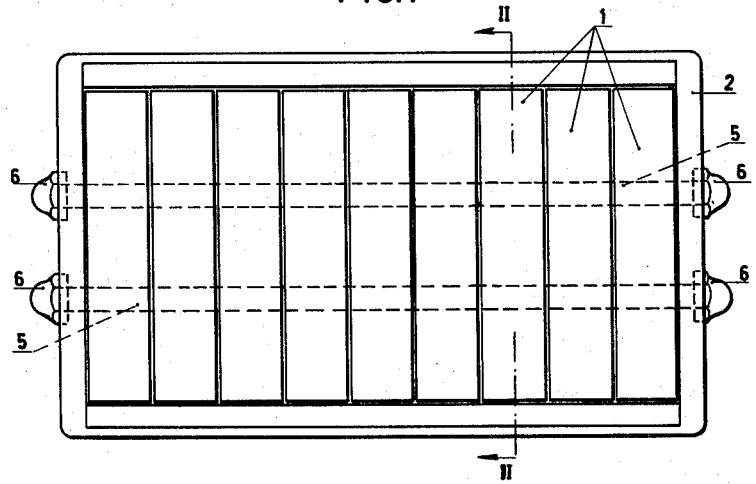
FIG. 1 shows a top plan view of the pedal according to the invention.
Figure 2:
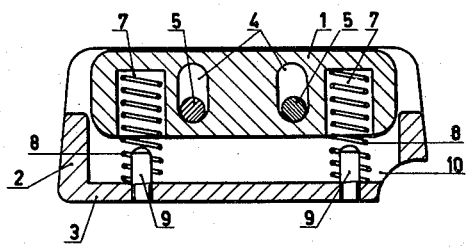
FIG. 2 shows a section according to the line II—II of FIG. 1.

In the figures a pedal is shown of which the upper surface consists of a number of metal strips 1 encased by a frame 2 which is integral with the under surface 3 of the pedal.

The strips 1 are provided with cross-bores 4 through each of which a rod 5 is passed. The rods 5 are passed through all cross-bores 4 and are threaded at their ends. By means of nuts 6 the rods 5 are fixed in the sides of the frame 2.

In each of the strips 1 there are two recesses 7 into which springs 8 extend, said springs being supported by the under surface 3 around pins 9 arranged in said bottom surface 3.

In the embodiment shown which has been drawn in full size the surface on which the foot comes to rest has a width of 118 mm., the strips each having a width of about 13 mm.

When the foot pushes on the pedal some adjoining strips are pressed down and one has at both sides of the foot a buffer or abutment rim so that the foot is firmly held in place.

At the underside of the pedal the under surface 3 does not quite continue up to the frame 2 so that a slot 10 is formed through which moisture and dirt which may accumulate under the strips 1 can flow off.

It will be understood that the invention is not restricted to the above-described embodiment. The strips may also be guided in the frame 2 and resiliently supported in another way.

The pedal according to the invention may be mounted as such in a vehicle but may also be mounted on existing treadles.

I claim:

1. A pedal member comprising frame means, a plurality of strip members disposed in said frame means in parallel relationship, each strip member having at least one bore therethrough so that each bore of each strip member is in a plane perpendicular with the parallel disposition of said strip members, mounting means passing through the bores of said strip members and being connected to said frame means to movably mount each strip member to be movable relative to each other and relative to said frame means, the number of said strip members being in excess of the width of a foot so that when the foot presses on said pedal member, some adjacent strip members are pressed down leaving an abutment on each side of said foot, and spring means disposed between each strip member and said frame means to normally maintain the upper portions of said strip members even with the top portions of the end sections of said frame means.

2. A pedal member according to claim 1, wherein each strip member has an additional bore therethrough disposed in a plane parallel to the plane containing the first mentioned bores, and additional mounting means passing through the additional bores and being connected to said frame means.

3. A pedal member for use on a vehicle comprising frame means having upstanding sides and end sections, said end sections extending above said side sections, a plurality of strip members disposed in said frame means between said side sections and parallel to said end sections with the upper portions of said strip members being substantially even with the top portions of said end sections, the number of strip members being in excess of the width of a foot, each of the strip members having an elongated bore therein so that each bore of each strip member is in a plane perpendicular to the parallel disposition of the strip members, mounting means passing through said bores and being connected to said end sections to movably mount each strip member to be movable relative to each other and relative to said fame means, and spring means disposed between the under portion of each strip member and said frame means to normally maintain the upper portions of said strip members even with the top portions of said end sections whereby when the foot presses on said pedal member, some adjacent strip members are pressed down leaving an abutment on each side of said foot.

4. A pedal member for use on a vehicle comprising frame means provided with end sections, a plurality of strip members disposed in said frame means between said end sections and parallel therewith, the number of said strip members being in excess of the width of a foot, the upper portions of the strip members being substantially even with the top portions of said end sections, each strip member having a bore therethrough so that each bore of each strip member is in a plane perpendicular to the parallel disposition of said strip members, mounting means passing through the bores and being connected to the end sections to movably mount each strip member to be movable relative to each other and relative to said frame means, and spring means disposed between each strip member and said frame means to normally maintain the upper portions of the strip members substantially even with the top portions of the end sections whereby when the foot presses on said pedal member, some adjacent strip members are pressed down leaving an abutment on each side of said foot.

References Cited in the file of this patent

UNITED STATES PATENTS 2,792,721    De Giovanni _____ May 21, 1957

FOREIGN PATENTS 16,422    Australia _____ Oct. 25, 1928
of 1928